No. 761,821. PATENTED JUNE 7, 1904.
W. H. CLARK & T. S. HARPER.
RIMLESS TRIVALVE VAGINAL SPECULUM.
APPLICATION FILED JAN. 27, 1904.

NO MODEL.

Witnesses
J. H. Deane
H. P. Campbell

Inventors
W. H. Clark
T. S. Harper
by Jacob W. Loeper
Atty.

No. 761,821.

Patented June 7, 1904.

UNITED STATES PATENT OFFICE.

WILLIAM H. CLARK AND THADDEUS S. HARPER, OF INDIANAPOLIS, INDIANA.

RIMLESS TRIVALVE VAGINAL SPECULUM.

SPECIFICATION forming part of Letters Patent No. 761,821, dated June 7, 1904.

Application filed January 27, 1904. Serial No. 165,311. (No model.)

*To all whom it may concern:*

Be it known that we, WILLIAM H. CLARK and THADDEUS S. HARPER, citizens of the United States of America, and residents of Indianapolis, Marion county, State of Indiana, have invented certain new and useful Improvements in Rimless Trivalve Vaginal Speculums, of which the following is a specification.

This invention relates particularly to trivalve speculums, and has for its object the provision of a speculum of simple and practical construction which may be most readily opened to obliterate the membranous folds and will maintain itself in position and permit an unobstructed view of the parts under examination.

The invention consists in certain peculiarities in the construction of parts and in certain novel combinations of elements, substantially as hereinafter described, and particularly pointed out in the subjoined claims.

Figure 1:
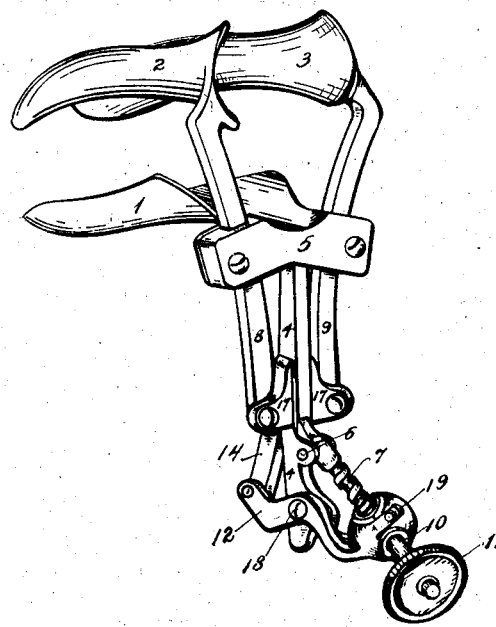
Figure 2:
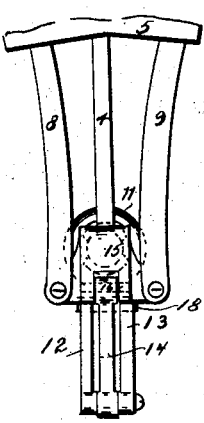
Figure 3:
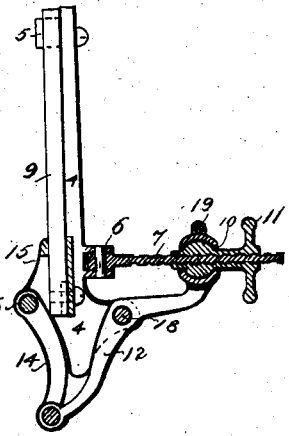

In the accompanying drawings, illustrating the invention, Figure 1 is a perspective view of our rimless trivalve vaginal speculum. Fig. 2 is a rear view of the speculum with the valves omitted, and Fig. 3 is a sectional view on the line $x$ $x$ of Fig. 2.

The same numerals of reference designate the same parts in the several views.

1, 2, and 3 represent the relatively adjustable valves, which in form are similar to valves used in speculums, except that no rims are formed on the valve ends on the larger diameter of the same, whereby the obstruction to the view through the valves caused by said rims is eliminated.

The frame of the speculum comprises a bar 4, having a yoke 5 at one end. Valve 1 extends from said yoke, while the valves 2 and 3, respectively, extend from the upper ends of levers 8 and 9, which extend through said yoke 5 and have their lower ends pivoted to ears 17, projecting from a cross-head 15, which is adapted to slide on said bar 4. Said cross-head has a lever connection with means adjustable to raise and lower it relatively to said bar to thereby cause said valves 2 and 3 to advance and recede toward and from each other and to move toward and from said valve 1. Said lever connection is preferably composed of two arms 12 and 13, pivoted intermediately, as shown at 16, to the lower end of bar 4 and having their inner ends connected by a link 14 with said cross-head 15 and their opposite ends arranged to be engaged by means adjustable to turn said arms pivotally in one or the other direction. The latter adjusting means preferably comprises a rod 7, having one end pivotally connected with the bar 4, as shown at 6, and provided with a worm-thread and with a ball 10, which is threaded thereon and has a hand-wheel 11 for adjusting it. Said ball 10 is received within a socket carried by the arms 12 and 13, said socket being preferably formed in halves, each integral with one of said arms, suitably secured together around the ball.

The operation of the parts in the adjustment of the valves is as follows: Fig. 3 shows the position of the adjusting means when the valves are closed, slide 15 in said position being at its lower limit of travel. In order to raise said slide, the wheel 11 is turned in the proper direction to cause the ball 10 to move outward on the worm 7, thus depressing the outer ends of the arms 12 and 13 and elevating the inner ends thereof, and consequently raising said slide, the articulations of the various parts obviously freely permitting the relative movements necessary to cause said movement of the slide. Upward movement of said slide carries the arms 8 and 9 and the valves 1 and 2 upward, and as said arms and the guide-slots in the yoke 5 (through which the arms 5 pass) are relatively such as to cause the arms to recede from each other during the upward movement a corresponding recession of the valves 2 and 3 relatively to each other is produced while they are moving away from the valve 1. This open position of the instrument is shown in Fig. 1. In closing the instrument the reverse of the above-described operation takes place, as is obvious.

We do not wish to be understood as limiting ourselves to the details of construction above set forth, as changes may be made therein without departing from the spirit of the invention.

Having thus described the best form of the invention, what we believe to be new, and desire to secure by Letters Patent, is—

1. In a speculum, the combination with the relatively adjustable valves having arms, means for guiding said arms, a slide to which said arms are pivoted, a lever mechanism connected with said slide and operated to adjust the same, and adjustable means engaging said lever mechanism and operated to adjust the same and thereby move said slide and adjust said valves bodily and pivotally.

2. In a speculum, the combination of a frame, a plurality of valves, two of which are adjustable, arms connected with said adjustable valves and extending through said frame and guided thereby, a slide mounted on said frame and to which the lower ends of said arms are pivoted, and a lever pivoted between its ends and having a pivotal connection with said slide.

3. In a speculum, the combination with relatively adjustable valves and a frame, of a slide carrying said adjustable valves, a rod pivotally connected with the frame, a pivoted lever mechanism having connection with said slide, and means adjustable on said rod and engaging the free end of said lever mechanism for adjusting the same.

4. In a speculum, the combination with the frame and relatively movable valves, of valve-adjusting means, comprising a slide having pivotal connection with the movable valves, a rod pivotally connected with the frame, a lever pivoted intermediate of its ends, means pivotally connecting one end of said lever with said slide, and means adjustable on said rod and engaged with the other end of said lever for adjusting the same pivotally.

5. In a speculum, the combination with the frame having a fixed valve, of a pair of valves movable relatively to each other and toward and from said fixed valve, said movable valves having arms, a slide to which said arms are pivoted, and means for adjusting said slide to thereby adjust said movable valves, comprising a rod pivotally connected with the frame, a lever pivoted intermediate of its ends, means pivotally connecting one end of said lever with said slide, and means adjustable on said rod and engaged with the other end of said lever for adjusting the same.

6. In a speculum, the combination with the frame provided with a fixed valve, of a pair of valves movable relatively to each other and to said fixed valve, arms depending from said pair of valves and guided by said frame, a slide to which the lower ends of said arms are pivoted, a pivoted worm, a lever mechanism pivoted between its ends to said frame and having one end arranged contiguous to said worm and its other end pivotally connected with said slide, and adjusting means on said worm engaging the contiguous end of the lever mechanism.

In testimony whereof we have hereunto signed our names in presence of two witnesses.

WILLIAM H. CLARK.
THADDEUS S. HARPER.

Witnesses:
J. H. Deane,
Joseph Kruger.